Patented Mar. 16, 1943

2,313,741

UNITED STATES PATENT OFFICE 2,313,741

ORGANIC COMPOUND AND PROCESS OF MAKING THE SAME

Max Engelmann, Wilmington, Del., and Josef Pikl, Pitman, N. J., assignors to E. I. du Pont de Nemours & Company, Wilmington, Del., a corporation of Delaware No Drawing. Application September 11, 1940, Serial No. 356,356

8 Claims. (Cl. 260—403)

This invention relates to novel organic compounds which may be designated generally as ethers of organic amido methylol compounds.

It is an object of this invention to produce novel organic derivatives of amido-methylol compounds by etherifying the OH group of the methylol radical. It is a further object of this invention to produce novel organic compounds having valuable surface-active properties. Other and further important objects of this invention will appear as the description proceeds.

We have found that methylol-amides react readily with compounds containing alcoholic hydroxyl groups according to the following reaction:

$$R-CO-N-CH_2-OH + OH-R'' = R-CO-N-CH_2-O-R'' + H_2O$$
$$\quad\quad\quad | \quad\quad\quad\quad\quad\quad\quad\quad\quad\quad\quad | $$
$$\quad\quad\quad R' \quad\quad\quad\quad\quad\quad\quad\quad\quad\quad R'$$

In this equation R is an aliphatic, aromatic, araliphatic, or cyclo-aliphatic radical, which may be attached to the CO group directly or through the agency of a non-carbonic link such as O, or NH, and preferably contains no water-solubilizing groups, while R' is hydrogen or an organic radical. As hydroxy compounds, to react as above with the methylol amides, one may use for instance polyhydroxy compounds, hydroxy-carboxylic acids, hydroxy-phosphonic acids, a hydroxy-alkyl-sulfonic acid or their esters, amides and other derivatives which still contain the OH group.

As a special subgroup of our generic invention above come the ethers of the general formula $$R-CO-NH-CH_2OR'$$

wherein R is an aliphatic or cycloaliphatic radical containing at least 7 carbon atoms and attached to the CO group directly or through the agency of oxygen, or a nitrogen atom. If in this formula R' is selected so as to have water-soluble groups, such as the carboxy, sulfonic or phosphonic acid radical, the resulting ether compounds form valuable agents for aqueous treatment of textile fiber to endow it with water-repellent properties. On the other hand, the compounds in which R' does not possess an acidic group may likewise be used as agents for textile fiber for similar purposes, but must be applied from organic solution, for instance, alcohol, benzene or acetone.

To facilitate the further discussion of this invention, the following typical instances of methylol compounds and of hydroxyl-bearing compounds are mentioned at this point, without any intent, however, to limit our invention to these instances.

A. Typical methylol compounds

Methylol-stearamide:

$$C_{17}H_{35}-CONH-CH_2OH$$

Methylol amide of naphthenic acid.
Methylol amide of hydroabietic acid.
Dimethylol of distearamido-methane:

$$C_{17}H_{35}-CO-N-CH_2OH$$
$$\quad\quad\quad\quad\quad | $$
$$\quad\quad\quad\quad\quad CH_2$$
$$\quad\quad\quad\quad\quad | $$
$$C_{17}H_{35}-CO-N-CH_2OH$$

Octadecyl-carbamido-methanol:

$$C_{18}H_{37}-O-CO-NH-CH_2OH$$

Octadecyl-ureido-methanol:

$$C_{18}H_{35}-NH-CO-NH-CH_2OH$$

Stearyl-ureido-methanol:

$$C_{17}H_{35}-CONH-CONH-CH_2OH$$

Benzamido-methanol:

$$C_6H_5-CONH-CH_2OH$$

B. Typical hydroxyl-bearing compounds (Etherifying agents)

Ethylene glycol:

$$HO-CH_2-CH_2OH$$

Diethylene glycol:

$$HO-CH_2-CH_2-O-CH_2-CH_2OH$$

Glycollic acid:

$$HO-CH_2-COOH$$

Glycollic-acid ethyl-ester:

$$HO-CH_2-CO-OC_2H_5$$

Lactic acid:

$$HO-CH-COOH$$
$$\quad\quad | $$
$$\quad\quad CH_3$$

Ethyl lactate:

$$HO-CH(CH_3)-CO-OC_2H_5$$

Hydroxy-methyl-phosphonic acid:

$$HO-CH_2-PO(OH)_2$$

2-Hydroxy-propane-phosphonic acid:

$$HO-CH-CH_2-PO(OH)_2$$
$$\quad\quad | $$
$$\quad\quad CH_3$$

Hydroxy-ethyl-sulfonic acid:

$$HO-CH_2-CH_2-SO_3H$$

It will be clear that by various combinations of the components in the two tables, numerous and varied ethers may be obtained.

The reaction between the methylol amides and the hydroxyl-group bearing compounds may be carried out by reacting the components, depending upon the nature of the compound, with or without a catalyst. Glycollic acid, for instance, reacts without any condensing agent, whereas ethylene glycol needs a small amount of an anhydrous, acid reacting condensing agent such as $PCl_3$, maleic anhydride, or anhydrous hydrogen chloride. If desired an inert diluent such as acetone, ethyl acetate or dioxane, may be used in carrying out this condensation. The reaction temperature may vary from about 0° to about 100° C. Those reactions which are carried out in the presence of a catalyst, may be carried out also below room temperature. The reaction may be carried out by reacting one mol of the methylol amide with one mol of the hydroxy compound, but generally an excess of the hydroxy compound will be desirable in order to carry the reaction to completion as far as possible. In many cases the hydroxy compound may be used in such a quantity as to serve also as a solvent or diluent for the reaction. In many cases, the methylol compound may be replaced by the corresponding methylene halide, for instance Stearamido-methylene-chloride:

Bis-chloromethyl-distearamido-methane:

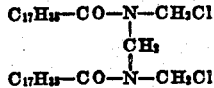

etc.

The group of products which are obtained with hydroxy compounds containing free acid groups are soluble in dilute alkaline aqueous media. They are quite stable in alkaline solution and may even be heated for a considerable length of time. They are, however, very sensitive to acids. If the sodium salt, for instance, of stearamido-methoxy-glycollic acid,

is acidified with hydrochloric acid, the free glycollic acid is first precipitated which can be brought back into solution by addition of a base. If, however, the acidified solution is heated for a few minutes, an insoluble product is formed which cannot be dissolved again by the addition of a base.

As already mentioned, the new compounds are characterized by surface-active properties, as a result of which they may be used variously in the textile-treatment arts, for instance as wetting agents, scouring agents, softening agents, emulsifying agents, and as dye-fixing, starch-fixing and waterproofing agents. For the latter purpose, the compounds having a long alkyl chain, say over 7 carbon atoms, and having a weakly-acid, water-solubilizing radical on the hydroxyl-bearing component, for instance a carboxylic-acid or phosphonic-acid radical, are of special interest, in view of the obvious economy of using aqueous treatment baths for textile material over organic solutions. However, regardless of the presence or absence of acidic radicals in the treating agents of this invention, the water-repellent effect on textile fiber obtained by the aid of these compounds is of a permanent nature, in the sense that it is not destroyed by repeated washings with soap or by dry-cleaning agents.

In order to obtain this effect, the textile material is impregnated, for instance, with a 2% aqueous solution of the ammonium salt of stearamido-methoxy-glycollic acid and then subjected to a heat treatment for a few minutes at 100 to 170° C. It is believed that the decomposition products obtained by acid hydrolysis as described above are the active principles for the production of the permanent water repellent and softening effect. It is therefore desirable to use either the free acids or their salts with weak bases in order to obtain the best effect. Such bases are, for instance, primary, secondary or tertiary organic bases such as pyridine, quinoline and their homologues as well as hydrogenation products, aniline, cyclohexylamine, ammonia, methylamine, dimethylamine, trimethylamine, triethylamine, and the ethanolamines. A further increase in the waterproofing effect can be obtained by the use of certain addition agents which produce a temporary acid reaction during the baking step. Such products which have been found to be effective are, for instance, ammonium chloride, pyridine hydrochloride, ammonium thiocyanate or a combination of thiourea or urea and ammonium chloride.

The novel products may also be used in combination with other waterproofing agents such as wax emulsions or in combination with other types of permanent water-repellency agents, for instance the quaternary-ammonium compounds described in U. S. Patent No. 2,146,392, or the amidomethyl-phosphonic acids of our copending application Serial No. 322,766, or the various water-repellency agents of the isocyanate and ketene classes. The water repellency produced according to the process outlined above may be further improved if the fibers are aftertreated with metallic salts such as aluminum acetate, aluminum sulfate or zirconium oxychloride.

The new products present great advantages over other products used for imparting permanent water-repellency, for instance the quaternary pyridinium compounds of U. S. Patent No. 2,146,392, above referred to. First of all, no pyridine is needed for the preparation of our novel products, and the use of these products thus eliminates a great safety hazard and health hazard in the application. Another advantage is the much greater stability of the products which facilitates greatly the application of the products, eliminating especially the low temperature drying step imperative in the aforegoing pyridinium compounds.

Without limiting our invention to any particular procedure, the following examples are given to illustrate our preferred mode of operation. Parts mentioned are by weight.

*Example 1*

220 parts of glycollic acid were heated to 70° C. and then mixed with 70 parts of acetone. To this mixture, there were added, while agitating, 70 parts of methylolstearamide. After a short time the reaction product becomes soluble in ammonia. Ice and water are added to the reaction mass to dissolve the excess glycollic acid. The stearamidomethyl ether of glycollic acid is insoluble in water and can be filtered off and dried. Recrystallized from methyl alcohol it has a melting point of 97° C. It is very soluble in dilute alkalies. The ammonium salt can be prepared as a readily crystallizing compound when ammonia is passed into the solution of the free acid in acetone, and probably corresponds to the formula

$C_{17}H_{35}$—CONH—$CH_2$—O—$CH_2$—CO—$ONH_4$

When a cotton fabric was impregnated with a 2% aqueous solution of this ammonium salt and then, with or without pre-drying, subjected for a few minutes to a baking step of 100 to 150° C., the fabric acquired a strongly water repellent soft finish which was not removed by repeated washings or by dry-cleaning agents.

An improved repellency was obtained when certain addition compounds were added such as thiourea, ammonium thiocyanate, stearamido-methyl phosphonic acid, methylol urea, ammonium chloride, or pyridine hydrochloride. All these products have the property in common that they give an acid reaction or an acid decomposition product upon heating to a higher temperature and that they are organic nitrogen derivatives.

Instead of methylol stearamide in the above example, there may be used the methylol compound of a fatty acid amide containing a mixture of 20 and 22 carbon atoms or the methylol compound of montanic acid or of the coconut oil acids.

*Example 2*

30 parts of methylol-stearamide were added to 80 parts of lactic acid of about 90% purity and heated for a few minutes to 60° C. The methylol amide went into solution and the mass became soluble in dilute ammonia. Upon addition of ice and water the excess of lactic acid was separated from the amorphous stearamidomethyl ether of lactic acid which is insoluble in water. The product is believed to have the formula

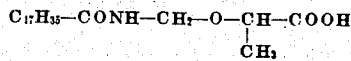
$C_{17}H_{35}$—CONH—$CH_2$—O—CH—COOH
$\quad\quad\quad\quad\quad\quad\quad\quad\quad\quad\quad |$
$\quad\quad\quad\quad\quad\quad\quad\quad\quad\quad CH_3$ When this product was applied in the same way as described in Example 1 it gave also a strongly water-repellent fabric.

*Example 3*

230 parts of crystalline hydroxy-methyl phosphonic acid were dissolved in 300 parts of acetone warmed to 55° C., and 100 parts of methylol-stearamide were added in the course of 10 minutes. The mass became rather thick and the reaction was finished in about five minutes. The product was isolated by adding more acetone and cooling to about 10° C.

There were obtained 120 parts of a crystalline material which analyzed for the hydroxy-methyl-phosphonic-acid-ether of methylol stearamide of the following formula

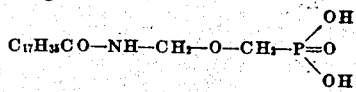
$$C_{17}H_{35}CO-NH-CH_2-O-CH_2-P\begin{matrix}\nearrow OH \\ \searrow OH\end{matrix}=O$$

This product was quite stable in an alkaline aqueous solution but decomposed readily with acids or by just warming in alcoholic solution.

This reaction may also be carried out in one step by reacting stearamide with formaldehyde and hydroxy-methyl phosphonic acid in acetone solution, or by reacting chloromethyl stearamide with hydroxymethyl phosphonic acid.

*Example 4*

25 parts of methylol-naphthenic-acid-amide, which was prepared by reacting naphthenamide with formaldehyde at 50° C. was added to 60 parts of glycollic acid which had been heated to 70° C. After heating for five minutes at 65 to 70° C. the reaction product was cooled down and ice was added to cool the charge and to dissolve the excess glycollic acid. The oily naphthenamido-methyl ether of glycollic acid was taken up in diethyl ether. The residue obtained on evaporation of the diethyl ether was soluble in dilute aqueous ammonia and decomposed when warmed with dilute acids.

*Example 5*

125 parts of ethylene glycol were mixed with 15 parts of methylol-stearamide and 5 parts of maleic anhydride and then agitated at 60° C. for four hours. After cooling, the reaction product was filtered and then recrystallized from a mixture of alcohol and water. It had a melting point of 86 to 88° C. and was very soluble in alcohol, ether and acetone. The product was presumably the mono-stearamido-methyl-ether of ethylene glycol.

This product was applied to cotton from a 60% alcoholic aqueous solution containing some oxalic acid and then subjected to a baking treatment for 3 minutes at 150° C. It gave a strongly water repellent finish which was only slightly removed by washing.

*Example 6*

60 parts of methylol-stearamide were mixed with 600 parts of ethyl acetate and 200 parts of diethylene-glycol. The mixture was cooled to 3° C. and one part of $PCl_3$ was added, whereupon the mass was agitated for 8 hours at between 3 and 6° C. After neutralizing the acid present, the reaction product was filtered, and the filter cake was mixed with 300 parts of ethyl alcohol and again filtered. This filtrate yielded upon evaporation stearamidomethyl diethylene glycol mono-ether, which has a melting point of 76 to 78° C.

When this product was applied to a cotton fabric from an alcoholic solution which contained some lactic or acetic acid, it imparted to the fabric a strong water-repellency, which was stable to washing.

*Example 7*

A mixture of 200 parts of glycollic acid and 75 parts of acetone was heated to 70° C., and then 50 parts of methylol-octadecyl-carbamate

$C_{18}H_{37}$—O—CONH—$CH_2OH$ obtained by reacting paraformaldehyde and octadecyl carbamate in alcohol containing potassium carbonate) were added. After about 15 minutes at 65° C., 600 parts of cold acetone were added and the mixture was agitated for awhile at 30° C. By filtration, there was removed a small amount of an insoluble by-product. From the filtrate the glycollic acid ether of the methylol carbamate,

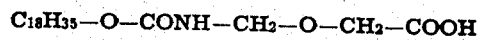
$C_{18}H_{35}$—O—CONH—$CH_2$—O—$CH_2$—COOH was precipitated by addition of water. It was soluble in dilute alkalies and decomposed with warm acids yielding a very insoluble compound.

*Example 8*

100 parts of glycollic acid were mixed with 25 parts of acetone and warmed to 70° C. Then 25 parts of the methylol amide of hydroabietic-acid (obtained by reacting paraformaldehyde and hydroabietic-acid-amide in alcohol in the presence of sodium hydroxide) were added, and the mixture was heated for 5 minutes to 65° C. After the reaction was completed, more acetone was added and the clear solution was poured into water and extracted with ether. The ethereal solution was washed several times with water to remove the excess glycollic acid. By passing ammonia into the ethereal solution, the ammonium salt of the hydroabietic-amido-methyl ether of glycollic acid was precipitated. It was completely soluble in water and decomposed upon warming with dilute acids.

Example 9

50 parts of isethionic acid (hydroxy-ethyl sulfonic acid) were suspended in 150 parts of acetone; 20 parts of methylol stearamide were added, and the mass was heated for fifteen minutes to 45 to 50° C. The reaction product was poured on ice and the sulfonic acid which was almost insoluble in the cold water was filtered off.

In hot water it dissolved to a viscous foaming solution. In the presence of ammonia or sodium carbonate, the solubility in water was considerably greater. Some by-product, which is insoluble in water may be removed from the above precipitate by extraction with acetone.

When cotton was impregnated with an aqueous solution of the ammonium salt and then heated for a few minutes to 150° C., it became water repellent.

Example 10

To 100 parts of octyl alcohol there were added 20 parts of methylol stearamide while a slow stream of hydrogen chloride was being passed into the reaction mixture at 30 to 40° C.

The methylol amide went gradually into solution, and a viscous mass was formed. After 20 minutes 500 parts of acetone were added. The mass was warmed to 45° C. and then gradually cooled until crystallization started. 23 parts of a well crystalline product was obtained which melted sharply at 81° C. The analysis of this product agreed with the hypothesis that it was the octyl ether of methylol stearamide, of the formula $C_{17}H_{35}-CONH-CH_2-O-C_8H_{17}$.

Example 11

To 100 parts of octyl alcohol there were added 20 parts of methylol benzamide, and the mixture was then warmed to 40 to 45° C., while a slow stream of hydrogen chloride was being passed into the reaction mixture. After 30 minutes, 400 parts of ether were added to the reaction mass and the latter was then cooled with a freezing mixture to −30° C. The reaction product crystallized readily at this temperature and was filtered rapidly. It melted sharply at 48° C., and was recrystallized from a mixture of alcohol and water.

The analysis indicated that it was most probably the expected octyl ether of methylol benzamide, of the formula $$C_6H_5-CONH-CH_2-C_8H_{17}$$

It will be understood that many variations in the details of procedure may be practiced, without departing from the spirit of this invention.

As methylol amides one may use any of the fatty-acid methylol-amides, which may be saturated or unsaturated, straight-chain, branched chain or cyclo aliphatic, and also the methylol compounds of the corresponding alkyl or acyl ureas or urethanes. One may also use methylol amides of aromatic or aralphatic acids. The methylol compounds may be substituted by various substituents, except water-solubilizing groups, and may be derived from mono- or poly-carboxylic acid amides. Other methylol compounds useful for this reaction may be prepared by decomposing chloromethylamides such as are disclosed in U. S. P. 2,131,362 or in British Patent 517,474, by treatment with water or basic compounds, for instance potassium carbonate.

The latter group of compounds forms the subject matter of copending application, Serial No. 362,790, by one of us, and may be expressed by the general formula $$R-CO-N-CH_2OH$$
$$\underset{R'}{|}$$

wherein R is an aliphatic radical free from water-solubilizing groups and being attached to the CO group through the agency of carbon, oxygen, sulfur or nitrogen, while R' is an alkyl radical.

Furthermore, as already mentioned above, the use of methylol-amides may be dispensed with by substituting in their place the corresponding methylene-halides. Thus, chloromethyl stearamide or methylene-di(stearamidomethyl chloride) may be reacted with any of the aforegoing hydroxyl-bearing compounds, for instance glycollic acid, hydroxy-methyl phosphonic acid, 2-hydroxy-propane-phosphonic acid, hydroxy-ethyl sulfonic acid, or other mono- or poly-hydroxy compounds, except cellulose, provided care is taken that the hydrogen halide which is formed in the reaction does not decompose the product.

This may be accomplished by reducing the reaction time to the shortest possible limit and by discouraging activity on the part of the hydrogen halide either by cooling down the reaction mass promptly after completion of the reaction, or by neutralizing the hydrogen halide formed in the reaction, or by diluting the latter to a point where its activity is very weak.

Still another way for the preparation of the novel compounds of this invention is the simultaneous reaction of a higher fatty-acid amide with formaldehyde and the selected hydroxy-compound at about 50° C.

As already indicated, those of the new compounds which possess a free acid group, such as the carboxylic, sulfonic or phosphonic acid group, are soluble in dilute aqueous alkalies, under formation of the corresponding salts. By evaporating these solutions, the salts may be isolated in solid form. In this fashion for instance, may be prepared the sodium, potassium, calcium and barium salts. The latter two types may also be obtained by a reaction of exchange between calcium chloride or barium chloride and the sodium-, potassium- or ammonium salt of the novel ether-acids. Iron, nickel, silver and other salts may be prepared by the same method. The ammonium salts are most conveniently prepared by passing ammonia gas into an acetone solution of the desired ether-acid. By these methods, any of the compounds obtained, for instance, in Examples 1, 2, 3, 4, 7, 8 and 9 may be converted into any optional salt. These salts are generally solids, whose degree of solubility in water follows the usual rules for salts of the corresponding cations.

Esters of the above referred to acids may be obtained by following in general the procedure of Examples 10 and 11, but choosing as etherifying agent an ester of the corresponding hydroxy-acid; that is, replacing the octyl alcohol of Examples 10 and 11 by an equivalent quantity of, for instance, ethyl-glycollate ($HO-CH_2-CO-OC_2H_5$) or ethyl-lactate.

As for the methylol-amides employed as initial materials for this invention, these may be prepared by standard methods; for instance, by heating (to about 50 or 60° C.) the corresponding carboxylic acid amide with paraformaldehyde, or other source of formaldehyde, in an inorganic liquid medium, such as methyl or ethyl alcohol, benzene, toluene or pyridine, in the presence of an acid absorbing agent, for instance potassium carbonate, sodium carbonate or pyridine. See for instance, U. S. Patents Nos. 2,146,392 and 2,212,654.

The methylene halides employed as an alternative for our initial materials as above indicated, are generally prepared by reacting with paraformaldehyde on the corresponding carboxylic acid amides in the presence of dry hydrogen chloride. See for instance, U. S. Pat. No. 2,131,362, British Patents Nos. 492,699 and 517,474.

In the claims below the expression "functional derivative" when referring to a radical such as OH, COOH, SO₃H or PO(OH)₂ shall be understood as a derivative obtainable by replacing the hydrogen atom (or one or both hydrogen atoms in the case of PO(OH)₂) by metallic atoms, cationic radicals or organic radicals, producing salts, esters or ethers of said radicals.

We claim:

1. Organic compounds being ethers of the general formula R—CO—NH—CH₂—O—R', wherein R is an organic radical free from water-solubilizing groups and being attached to the CO-group through the agency of an atom selected from the group consisting of carbon, oxygen and nitrogen, while R' is an organic radical having at least one aliphatic carbon atom and being attached to the O-atom through said aliphatic carbon atom and containing further a substituent selected from the group consisting of OH, COOH, SO₃H, PO(OH)₂, and functional derivatives of the same.

2. Organic compounds as defined in claim 1, R being an aliphatic radical having an alkyl chain of at least 7 carbon atoms.

3. Organic ethers of the general formula

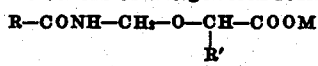

wherein R is a radical selected from the group consisting of aliphatic and cycloaliphatic radicals having not less than 7 carbon atoms and being free from water-solubilizing groups, R' stands for a substituent selected from the group consisting of hydrogen and lower alkyl, while M stands for a member of the group consisting of hydrogen and cationic radicals.

4. Organic ethers of the general formula

R—CONH—CH₂—O—CH₂—CH₂—OZ wherein R is a radical selected from the group consisting of aliphatic and cycloaliphatic radicals having not less than 7 carbon atoms and being free from water-solubilizing groups, while Z stands for a member of the group consisting of hydrogen and the radical CH₂—CH₂OH.

5. Organic ethers of the general formula

R—CONH—CH₂—O—CH₂—PO(OM)₂ wherein R is a radical selected from the group consisting of aliphatic and cycloaliphatic radicals having not less than 7 carbon atoms and being free from water-solubilizing groups, while M stands for a member of the group consisting of hydrogen and cationic substituents.

6. The process of producing novel organic compounds which comprises interacting an agent having an alcoholic OH group and at least one further substituent selected from the group consisting of OH, COOH, SO₃H, PO(OH)₂, and functional derivatives of the same, with an amidomethylene compound of the general formula

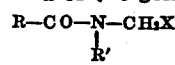

wherein R is an organic radical free from water-solubilizing groups and attached to the CO group through the agency of an atom selected from the group consisting of carbon, oxygen and nitrogen, R' is a member of the group consisting of hydrogen and organic radicals free from water-solubilizing groups, while X stands for a member of the group consisting of halogen and the hydroxyl group, and recovering the resulting ether compound.

7. The process of producing novel ether compounds which comprises reacting upon a compound of the general formula

R—CONH—CH₂—X, wherein R is a radical selected from the group consisting of aliphatic and cycloaliphatic radicals free from water-solubilizing groups and containing at least 7 carbon atoms and X stands for a member of the group consisting of halogen and hydroxy, with a hydroxyl-bearing compound of the general formula HO—R', wherein R' stands for an organic radical carrying at least one substituent of the group consisting of OH, COOH, SO₃H and PO(OH)₂, and being attached to the O-atom through the agency of a methylene group.

8. An organic compound selected from the group consisting of amido-ethers of the general formulae

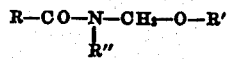

and

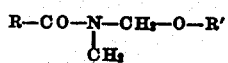

wherein R is an organic radical free from water-solubilizing groups and being attached to the CO-group through the agency of an atom selected from the group consisting of carbon, oxygen, and nitrogen, R" is a member of the group consisting of hydrogen and alkyl, while R' is an organic radical having at least one aliphatic carbon atom and being attached to the O-atom through the agency of said aliphatic carbon atom and containing further a substituent selected from the group consisting of OH, COOH, SO₃H, PO(OH)₂, and functional derivatives of the same.

MAX ENGELMANN.
JOSEF PIKL.